United States Patent [19]

Klimczak

[11] Patent Number: 5,421,846
[45] Date of Patent: Jun. 6, 1995

[54] AIR FILTRATION APPARATUS FOR THE CONTROL OF INDUSTRIAL AIR POLLUTION

[75] Inventor: William J. Klimczak, Charlotte, N.C.

[73] Assignee: Dustex Corporation, Charlotte, N.C.

[21] Appl. No.: 111,710

[22] Filed: Aug. 25, 1993

[51] Int. Cl.6 .................................................. B01D 35/16
[52] U.S. Cl. ........................................ 55/302; 55/428; 55/433; 55/502; 55/510; 95/280
[58] Field of Search ................... 55/302, 502, 510, 429, 55/433, DIG. 46, 428; 95/280

[56] References Cited

U.S. PATENT DOCUMENTS

| | | | |
|---|---|---|---|
| 3,733,790 | 5/1973 | Pierce | 55/324 |
| 3,910,782 | 10/1975 | Struble et al. | 55/444 |
| 3,966,434 | 6/1976 | Frazier | 55/302 X |
| 4,058,379 | 11/1977 | Cheng | 55/302 |
| 4,202,676 | 5/1980 | Pelosi, Jr. et al. | 55/356 X |
| 4,218,227 | 8/1980 | Frey | 55/302 |
| 4,306,893 | 12/1981 | Fernando et al. | 55/302 |
| 4,372,762 | 2/1983 | Cooley | 55/302 X |
| 4,388,087 | 6/1983 | Tipton | 95/26 |
| 4,578,092 | 3/1986 | Klimczak | 55/302 |
| 4,610,704 | 9/1986 | Richard | 55/302 |
| 4,681,609 | 7/1987 | Howeth | 55/302 |
| 4,789,387 | 12/1988 | Nemesi et al. | 55/302 X |
| 4,836,834 | 6/1989 | Steele | 55/302 X |
| 4,910,047 | 3/1990 | Barnett et al. | 55/302 X |
| 4,955,996 | 9/1990 | Edwards et al. | 55/502 X |
| 5,069,691 | 12/1991 | Travis et al. | 55/356 X |
| 5,110,331 | 5/1992 | Williams | 55/302 |
| 5,147,427 | 9/1992 | Abbot et al. | 55/302 |

FOREIGN PATENT DOCUMENTS 3805718 9/1989 Germany .............................. 55/324

OTHER PUBLICATIONS

Installation and Operation Manual, Models ECB-2/ECB3/ECB4, Donaldson Company, Inc., 14 pages, 1985.
Filtajet Dust Control, one page brochure, Filtajet, Salisbury, N.C., Apr. 26, 1991.

*Primary Examiner*—Richard L. Chiesa
*Attorney, Agent, or Firm*—Bell, Seltzer, Park & Gibson

[57] ABSTRACT

An air filtration apparatus for industrial applications is disclosed, which includes a front vertical wall which can be positioned to form one side of a work station. The interior of the housing is divided between an upper dirty air chamber which receives the contaminated air from the work station, and a lower clean air chamber. The dividing wall between the two chambers is in the form of a transverse panel which is inclined with respect to the horizontal, and a plurality of hollow pedestals extend upwardly from the transverse panel. Cartridge type filters are mounted upon the pedestals, with the open ends of the filters facing downwardly and being pressed against the pedestals by hand operated clamps so as to form a seal therebetween. A reverse pulse air cleaning system is also provided, which periodically injects a pulse of air upwardly into the lower open end of each of the filters, so as to periodically clean the collected particulates from the outer surfaces of the filters. The removed particles then drop onto the inclined transverse panel and slide therealong toward to the front vertical wall of the housing, where they may be readily removed.

10 Claims, 2 Drawing Sheets

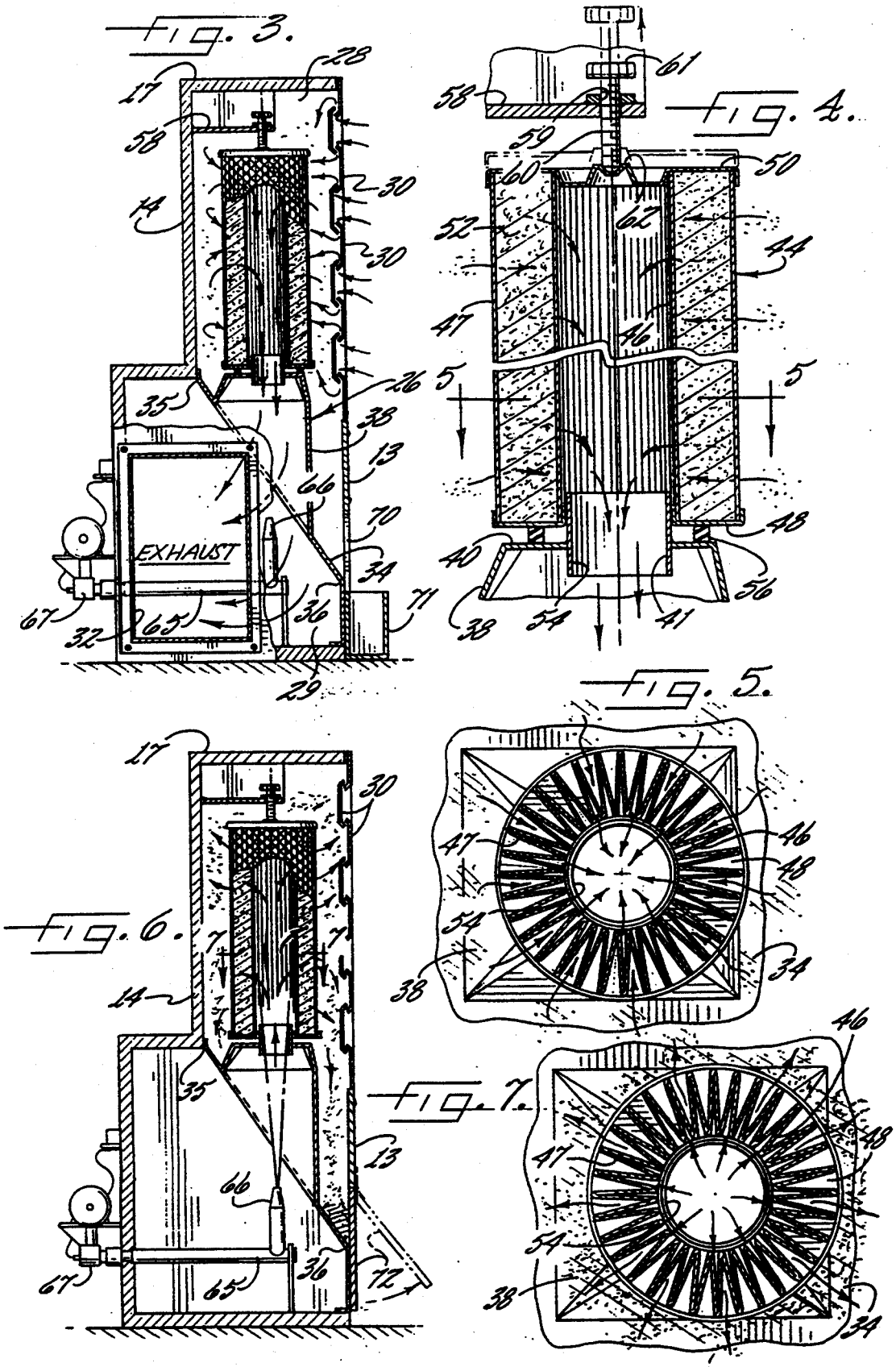

AIR FILTRATION APPARATUS FOR THE CONTROL OF INDUSTRIAL AIR POLLUTION

BACKGROUND OF THE INVENTION

The present invention relates to an air filtration apparatus adapted to remove dust and other airborne particulates from a work station where an industrial operation, such as grinding, sanding, electrostatic powder coating, or abrasive blasting is being performed.

In the performance of industrial processes of the described type, significant quantities of dust and other particulates become entrained in the atmosphere surrounding the work station. Such airborne particulates present a significant health hazard to the workers, and the release of the particulates to the atmosphere can cause environmental problems.

To alleviate these problems, it has been proposed to position an air filtration apparatus along one side of the work station, so that the contaminated air is drawn from the work station through the apparatus and cleaned before being released to the atmosphere. One air filtration apparatus of this type is described in U.S. Pat. No. 5,147,427 to Abbott et al. The apparatus as described in the Abbott et al patent includes a housing which has a louvered front wall which is positioned to form a common wall with the work station. Also, a horizontal panel divides the housing into a lower dirty air chamber which receives the contaminated air from the work station, and a upper clean air chamber. A plurality of cartridge type filters are mounted to the horizontal panel and depend into the dirty air chamber and so that the dirty air which enters through the louvers at the lower portion of the housing passes upwardly through the filters and into the upper clean air chamber. The particulates are thus collected on the outer surfaces of the filters. Also, a reverse pulse air cleaning system is provided, by which the collected particulates may be periodically removed from the outer surfaces of the filters and so that they drop into slide drawers located in the bottom of the housing.

One significant disadvantage of the above described prior system is the fact that the contaminated air flows into the housing at ground level. As a result, the air flows through the work station primarily at ground level, and the flow at upper levels, which correspond to the breathing levels of the workers in the work station, may be less than is desirable to insure that clean air is available for breathing.

As a further disadvantage of the above described prior design, the clean air chamber is at the top of the housing which often requires that the outlet fan or blower be mounted on the top of the housing above the clean air chamber. This in turn may cause the housing to vibrate, and the location of the fan or blower on the housing requires that the housing be sufficiently strong to support the weight of the fan or blower.

It is accordingly an object of the present invention to provide an air filtration apparatus adapted for the control of industrial air pollution, and which alleviates the above noted disadvantages of the prior art systems.

It is another object of the present invention to provide an air filtration apparatus of the described type which provides for the contaminated air to enter the housing at an elevated level which corresponds to the breathing levels of the workers in the work station, so as to improve the quality of the air being breathed by the workers.

It is also an object of the present invention to provide an air filtration apparatus of the described type wherein the fan or blower may be positioned on the floor adjacent the housing so as to avoid imparting vibrations to the housing and to reduce the required strength of the housing.

It is still another object of the present invention to provide an air filtration apparatus of the described type which has provision for easily removing the particulates from the work station side of the housing, without the use of slide drawers or other complicated components.

SUMMARY OF THE INVENTION

The above and other objects and advantages of the present invention are achieved in the embodiment illustrated herein by the provision of an air filtration apparatus which comprises a housing which includes a front vertical wall which is adapted to form one side of the work station, a rear vertical wall, and transverse wall means which divides the housing into an upper inlet air chamber and a lower outlet air chamber. The housing also has air inlet means formed in said front vertical wall and communicating with said upper inlet air chamber, and air outlet means communicating with said lower outlet air chamber.

The transverse wall means includes a transverse panel extending between the rear vertical wall and the front vertical wall, with the transverse panel being inclined with respect to the horizontal and so as to define an upper edge adjacent one of the front and rear vertical walls and a lower edge adjacent the other of the front and rear vertical walls. A plurality of hollow pedestals extend upwardly from the transverse panel and which are laterally spaced apart from each other, with each of the pedestals having an upper horizontal wall segment, and an opening positioned in each of said horizontal wall segments.

A plurality of tubular filter elements are also provided, with each having an open end, and a closed opposite end. The filter elements are disposed in the upper inlet air chamber of the housing and such that the open ends thereof face downwardly and are in registry with respective ones of the openings in the wall segments of said pedestals.

A reverse pulse air cleaning means is also provided in the housing for periodically directing a pulse of air upwardly through each of said openings and into the associated filter elements. Thus during operation of the reverse pulse cleaning means, the particulates are removed from the outer surfaces of the filter elements and fall onto the transverse panel and slide therealong toward one of the walls of said housing where they may be readily removed. Preferably, the transverse panel is oriented so that its lower edge is adjacent the front vertical wall of the housing and the front vertical wall includes an opening for permitting removal of the particulates which have collected on the transverse panel.

In the preferred embodiment, the air filtration apparatus further comprises an annular sealing gasket disposed about each of the openings and between the open end of the associated filter element and the associated horizontal wall segment. Also, a releasable clamping mechanism is provided for biasing each of the filter elements downwardly against the associated sealing gasket so as to form an air seal between each of the filter elements and the associated horizontal wall segment.

BRIEF DESCRIPTION OF THE DRAWINGS

Some of the objects and advantages of the present invention having been stated, others will appear when taken in conjunction with the accompanying drawings, in which:

FIG. 3 is an end sectional view taken substantially along the line 3—3 of FIG. 2;

FIG. 4 is an enlarged sectional view of one of the filters of the apparatus shown in FIGS. 1–3;

FIG. 5 is a sectional plan view of the filter taken substantially along the line 5—5 of the FIG. 4;

FIG. 6 is a view similar to FIG. 3 but illustrating the air flow in the apparatus during the reverse pulse air cleaning operation, and further illustrating a modified embodiment of the opening for removal of the collected particulates; and FIG. 7 is a view similar to FIG. 5 but illustrating the air flow through the filter during the air cleaning operation.

DETAILED DESCRIPTION OF THE PREFERRED EMBODIMENTS

Figure 1:
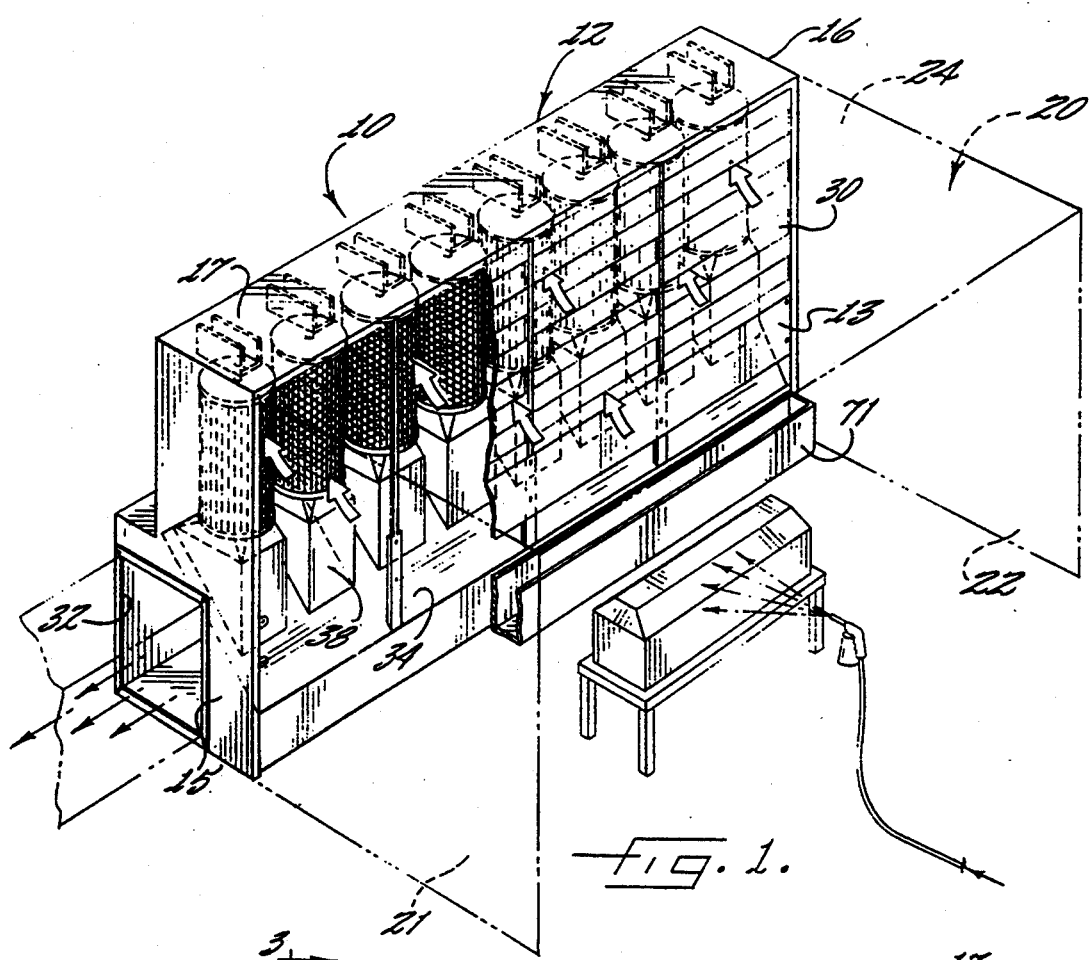
FIG. 1 is a partially broken away perspective view of an air filtration apparatus which embodies the features of the present invention, and which is shown in conjunction with a conventional work station.
Figure 2:
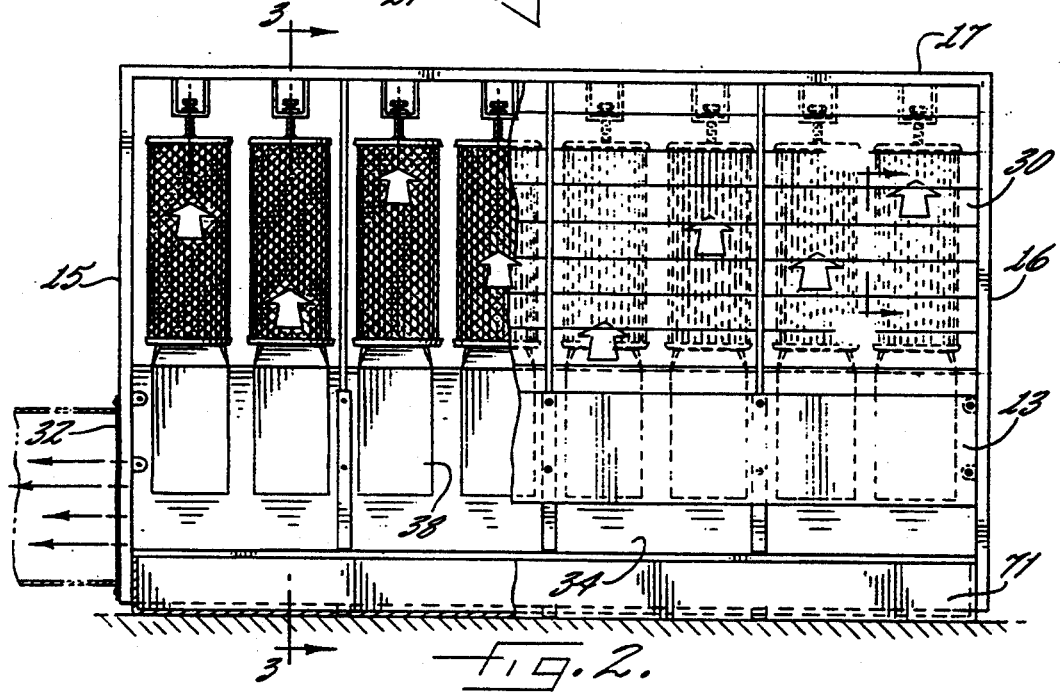
FIG. 2 is a partially sectioned front elevation view of the apparatus.

An air filtration apparatus which embodies the features of the present invention is illustrated generally at 10 in the drawings. The apparatus 10 comprises a housing 12 which includes a front vertical wall 13, a rear vertical wall 14, opposite end walls 15, 16, and a top wall 17. As best seen in FIG. 1, the front vertical wall 13 is adapted to form one side of a work station 20 wherein an electrostatic powder paint or other industrial operation as described above may be performed. The work station 20 includes side walls 21, 22 which extend from the end walls 15, 16 of the housing, and a top wall 24 which extends horizontally from the top wall 17 of the housing. The front side of the work station is open to permit air to flow through the work station and to the filtration apparatus 10 in a manner more fully described below.

The housing 12 of the apparatus further includes transverse wall means 26 which serves to divide the housing into an upper inlet air chamber 28 and a lower outlet air chamber 29. Also, the upper portion of the front wall 13 of the housing is composed of horizontally disposed and spaced apart baffle plates 30, which act as an air inlet for admitting the contaminated air from the work station into the upper inlet chamber 28 of the housing. The baffle plates 30 overlie a substantial portion of that portion of the front vertical wall 13 which overlies the upper inlet air chamber 28, and they preferably overlie at least the upper 50% of the entire area of the front vertical wall 13. An air outlet 32 is positioned in the end wall 15 in communication with the lower outlet air chamber 29, and the air outlet 32 is adapted to be connected to a fan or blower which may be positioned at ground level adjacent the end wall 15 as indicated schematically in FIG. 1.

The transverse wall means 26 is composed of a transverse panel 34 which extends between the rear vertical wall 14 and the front vertical wall 13. As best seen in FIGS. 3 and 6, the transverse panel 34 is inclined with respect to the horizontal, at an angle of preferably at least about 45°, and so as to define an upper edge 35 adjacent the rear vertical wall 14 and a lower edge 36 adjacent the front vertical wall 13. A plurality of hollow pedestals 38 extend upwardly from the transverse panel, and the pedestals 38 are laterally spaced apart from each other in a row extending between the end walls 15, 16 of the housing. Also, each of the pedestals 38 has an upper horizontal wall segment 40, and an opening 41 is positioned in each of the horizontal wall segments.

The apparatus 10 further includes a plurality of cartridge type tubular filters 44 of conventional design and which are positioned in the upper inlet air chamber 28 of the housing. Each of the filters 44 has a substantially rigid frame, which is composed of inner and outer coaxially disposed tubular sleeves 46, 47, which are air permeable and radially spaced apart. An annular plate-like ring 48 is mounted transversely between the inner and outer sleeves and defines an open end of the filter, and a solid end cap 50 is mounted transversely between the inner and outer sleeves and defines a closed end of the filter. Each of the filters 44 also comprises a pleated filter medium 52, such as a suitable filtering paper, disposed between the inner and outer sleeves.

The filters 44 are disposed in the upper inlet air chamber 28 such that their open ends face downwardly and are in registry with respective ones of the openings 41 in the wall segments 40 of the pedestals 38. To maintain this registry, each of the openings 41 preferably mounts a cylindrical sleeve 54, which is oriented along a vertical axis, and which is dimensioned so as to have an outer diameter only slightly less than the diameter of the opening in the annular ring 48 at the lower end of the filter. In its operating position, the sleeve 54 is received in the opening in the annular ring 48, to thereby retain the alignment of the filter with the opening 41 in the wall segment.

Means are also provided for sealing the interface between the lower open ends of the filters 44 and the wall segments 40, which includes an annular sealing gasket 56 disposed about the sleeve 54 of each of the openings. This sealing means also includes a manual clamping assembly by which each of the filters may be biased downwardly into sealing engagement with the gaskets 56, and by which the assembly of the filters in their operative positions may be maintained. The manual clamping assembly is mounted to a plate 58 which is fixed in the housing above the filters, and each plate 58 has a threaded nut 59 which mounts a vertically disposed clamping bolt 60. The bolt 62 has an enlarged head 61 to facilitate its manual rotation, and the lower end of the bolt is adapted to engage an indentation 62 in the end cap 50 of the filter 44. As will be apparent, each filter 44 may be biased downwardly by rotation of the associated bolt 62 in one direction so that the gasket 56 is compressed between the wall segment 40 and the annular ring 48 at the lower end of the filter, and the filter may be released and removed upon rotation of the bolt in the opposite direction.

The apparatus 10 of the present invention further includes a reverse pulse air cleaning system for periodically directing a pulse of pressurized air upwardly through each of the openings 41 and into the associated filter. As best seen in FIGS. 3 and 6, this cleaning system includes a manifold pipe leading to a source of pressurized air (not shown), and the manifold pipe is connected to a delivery pipe 65 and nozzle 66 which is associated with each filter. A solenoid operated valve 66 is connected to the delivery pipe 65, so that upon the momentary opening of the valve a pulse of pressurized air is directed upwardly through the associated opening 41 and into the interior of the associated filter. Upon entering the interior of the filter, the pulse causes the particulates which have collected on the outer surface of the filter media to be dislodged. In this regard, it will be noted that the pedestals 38 are configured so that there are a minimum of horizontal surfaces outside the projected diameter of the filters upon which the particulates would collect. Thus substantially all of the particulates fall directly onto the transverse panel 34 and slide toward the front vertical wall 13.

In the embodiment of FIG. 3, a horizontal open slot 70 is positioned in the front vertical wall 13 just above its intersection with the lower edge 36 of the transverse panel 34, and a dust trough 71 is mounted at the base of the wall 13 just below the slot 70. The discharged particulates are thus free to slide directly into the trough where they may be readily moved by a vacuum cleaner or the like. In the embodiment of FIG. 6, a hinged panel 72 is positioned on the front wall 13 just above the intersection with the transverse panel 34, so that when the hinged panel 72 is closed, the collected particulates may be retained in the housing. Upon opening the hinged panel, the particulates may be readily removed.

As will be readily understood by those skilled in the art, the cartridge filters 44 will need to be periodically replaced, at intervals depending upon the nature of the industrial operation being performed at the work station 20. Such removal may be effected by removing the front vertical wall 13 from the remainder of the housing, and then manually releasing each of the filters 44 by manual rotation of the biasing bolts 60. The filters 44 may then be lifted from their pedestals and replaced with new filters. The new filters are then clamped into sealing engagement with the gaskets B6 by the bolts 60, and the front vertical wall 13 is replaced. As an alternative to the removal of the front wall 13, a small removable panel (not shown) may be positioned in the rear wall 14 for permitting access to and removal of the filters.

In use, the blower is activated so as to draw the contaminated air through the work station 20 and into the housing 12. In a large installation, it will be appreciated that a blower may be positioned at each end of the housing 12 to provide the desired capacity. The contaminated air enters the upper inlet air chamber 28 through the baffle plates 30, and it then passes through the filters so that the particulates collect on the outer surfaces of the filters. The clean air then passes downwardly through the openings 41 and into the lower outlet air chamber 29, and it is then withdrawn through the air outlet 32 which leads to the blower.

During the periodic operation of the reverse pulse air cleaning system, the particulates are blown from the outer surfaces of the filters and they fall onto the transverse panel 34 and slide therealong toward the front vertical wall 13 for subsequent removal in the manner described above.

It will be noted that in accordance with the present invention, the air moves into the housing at a relatively high elevation, which corresponds to the relatively high elevation of the baffle plates 30 and filters 44 in the housing of the present invention. This relatively high elevation also corresponds to the breathing level of the workers in the work station 20, and thus the apparatus of the present invention facilitates the passage of clean air past the workers at their breathing elevation, as opposed to a location adjacent the floor of the work station. The quality of the air being breathed by the workers may thus be enhanced.

While the apparatus 10 has been illustrated and described as forming the back wall of the work station 20, it will be understood that the apparatus 10 could be placed inside the work station, with the discharge air being ducted to the outside.

That which is claimed is:

1. An air filtration apparatus for removing dust and other airborne particulates from a work station, and comprising a housing which includes a front vertical wall a rear vertical wall, transverse wall means dividing said housing into an upper inlet air chamber and a lower outlet air chamber, air inlet means formed in said front vertical wall and communicating with said upper inlet air chamber, and air outlet means communicating with said lower outlet air chamber, said transverse wall means including a transverse panel extending between said rear vertical wall and said front vertical wall, with said transverse panel being inclined with respect to the horizontal and so as to define an upper edge adjacent one of said front and rear vertical walls and a lower edge adjacent the other of said front and rear vertical walls, and a plurality of hollow pedestals extending upwardly from said transverse panel and which are laterally spaced apart from each other, with each of said pedestals having an upper horizontal wall segment, and an opening positioned in each of said horizontal wall segments, said other of said front and rear vertical walls including means aligned with said lower edge of said transverse panel for permitting removal of particulates which have collected on said transverse panel, a plurality of tubular filter elements, with each of said filter elements having an open end, and a closed opposite end, and with said filter elements being positioned in said upper inlet air chamber of said housing and such that the open ends thereof face downwardly and are in registry with respective ones of said openings in said wall segments of said pedestals, and reverse pulse air cleaning means for periodically directing a pulse of air upwardly through each of said openings and into the respective filter elements, said air inlet means including means for permitting air to enter into said upper inlet air chamber of said housing through said air inlet means, then pass through said filter elements and so that the particulates collect on outer surfaces of said filter elements, said openings being positioned for passing the clean air through said openings and into said lower outlet air chamber so as to be finally withdrawn through said air outlet means, and said reverse pulse air cleaning means remove the particulates from the outer surfaces of said filter elements so that said particulates fall onto said transverse panel and slide therealong toward said other of said front and rear vertical walls of said housing.

2. The air filtration apparatus as defined in claim 1 further comprising means for releasably sealing each of the open ends of each of said filter elements to the respective horizontal wall segments of the pedestals.

3. The air filtration apparatus as defined in claim 2 wherein said upper edge of said transverse panel is adjacent said rear vertical wall, and said lower edge of said transverse panel is adjacent said front vertical wall.

4. The air filtration apparatus as defined in claim 1 wherein said transverse panel is inclined from the horizontal at an angle of at least 45 degrees.

5. The air filtration apparatus as defined in claim 2 further comprising a cylindrical sleeve mounted in each of said openings and so as to extend into said open end of the respective filter element, and so as to retain the alignment of the filter elements and openings.

6. The air filtration apparatus as defined in claim 2 wherein said air inlet means in said front vertical wall of said housing comprises a plurality of spaced apart baffle plates which overlie a substantial portion of that portion of said front vertical wall which overlies said upper inlet air chamber.

7. The air filtration apparatus as defined in claim 6 wherein said baffle plates overlie at least about the upper 50% of the entire area of said front vertical wall.

8. The air filtration apparatus as defined in claim 2 wherein each of said filter elements comprises inner and outer tubular air permeable sleeves, with said sleeves being radially spaced apart, a pleated filter medium positioned between said inner and outer sleeves, an annular ring mounted transversely between said inner and outer sleeves and defining said open end of said filter element, and a solid end cap mounted transversely between said inner and outer sleeves and defining said closed end of said filter element.

9. The air filtration apparatus as defined in claim 2 wherein said releasable sealing means comprises sealing gasket means positioned about each of said openings and between the open end of the respective filter element and the respective upper horizontal wall segment, and means for releasably biasing each of said filter elements downwardly against the respective sealing gasket means so as to form an air seal between each of said filter elements and the respective upper horizontal wall segment.

10. The air filtration apparatus as defined in claim 9 wherein at least one of said front and rear vertical walls includes removable panel means so as to permit access to said releasable biasing means, and removal and introduction of the tubular filter elements, through said removable panel means.

* * * * *